UNITED STATES PATENT OFFICE.

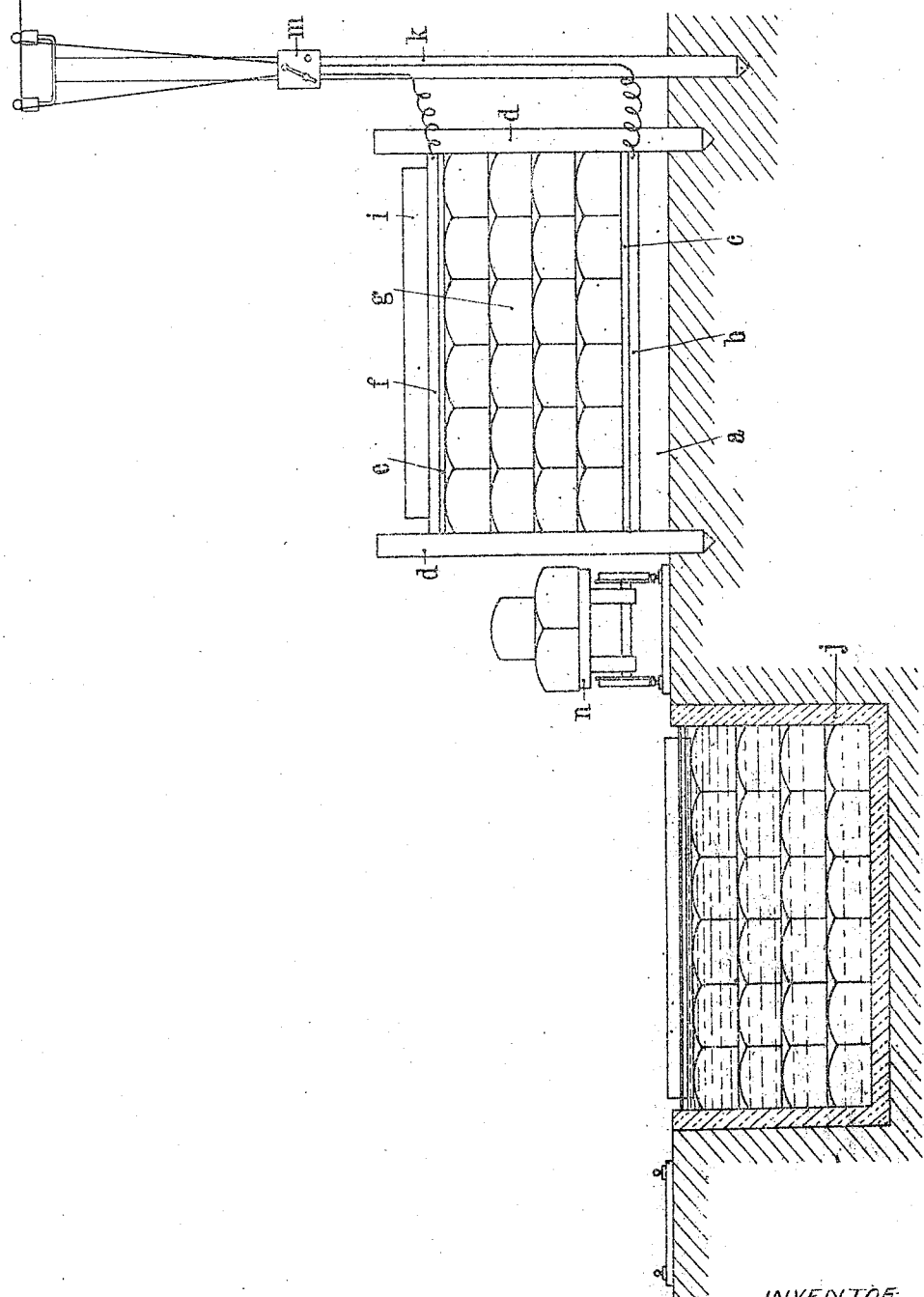

ALBERT LOUIS CAMILLE NODON, OF BORDEAUX, FRANCE.

PROCESS FOR THE ELECTRIC TREATMENT OF CELLULOSE.

1,198,867.   Specification of Letters Patent.   Patented Sept. 19, 1916.

Application filed February 28, 1913. Serial No. 751,304.

*To all whom it may concern:*

Be it known that I, ALBERT LOUIS CAMILLE NODON, a citizen of the French Republic, and a resident of 12 Rue de Moulis, Bordeaux, France, have invented certain new and useful Improvements in and Relating to Processes for the Electric Treatment of Cellulose, of which the following is a complete specification.

This invention relates to a process for treating wood and other substances based on cellulose so that they are not liable to putrefaction and also to increase their power of resistance.

The known methods for treating cellulose electrolytically are expensive, unreliable and imperfect, for when immersing the substance to be treated in vessels half full of saline solution, that part of the substance immersed is more affected than the one outside; on the other hand when first immersing the substance in saline solutions, and then passing an electric current through, if the substance is too wet, the current passes only through the liquid and never affects in any way the substance to be treated.

The process, according to the present invention, consists in first immersing the substances to be treated for a short time in a saline solution in order to effect a superficial impregnation and then submitting the matter thus impregnated, to the prolonged action of an electric current with the object of facilitating the current penetrating to the interior of the substances to be treated. The passage of the current is facilitated by a certain state of humidity of the cellulose; its effect being sufficiently lengthened and the ionization caused by the current, produce a complete transformation of the cellulose.

If the electrolytic action is sufficiently prolonged the substance resulting from the isomeric transformation of the cellulose is rendered imputrescible and indestructible by the most active destructive agents such as certain myceliums of wood in the presence of air and heat. That is to say, the electric current destroys certain organic constituents of the cellulose substance which are easily attacked by the destructive agents of the wood. The powers of resistance of the cellulose is, besides, greatly increased and its physical aspect is not modified to any great extent.

The accompanying drawing shows, by way of example, a device permitting of treating the cellulose and its derivatives electrolytically.

This device comprises a cement or bitumen covered area $a$ arranged on the ground and covered over with a conducting surface $b$ such as, for example, a sheet of lead or of galvanized iron or a flexible metallic carpet forming one of the electrodes. A carpet of coarse fabric $c$ saturated with water is spread over the electrodes. The substance to be treated $g$ which, in the present instance, I have illustrated as consisting of wooden sleepers, previously sufficiently moistened, is piled up on the carpet electrode, in the shape of a regular figure, the height of which corresponds to the electric resistance of the substance. Wooden stakes $d$ are driven into the ground so as to maintain the substance in place, especially in the case of substances other than wood.

The surface of the substance to be treated is covered with a carpet electrode similar to that at its base, comprising a carpet of coarse fabric $e$ and an electrode constituted by a conducting surface capable of covering the exterior surface of the mass to be treated. A network or coat of mail of galvanized steel or a metallic fabric of copper or a sheet of lead $f$ can be utilized. A heavy mass $i$ is placed over the whole so as to insure the intimate contact of the device.

Shallow cement reservoirs $j$ are arranged on the ground in the vicinity of the substance so that the substances to be treated can be immersed so as to insure the passage of the current through the same. After a short immersion so as to impregnate the substances superficially they are removed and placed in racks for further treatment.

Posts $k$ provided with switches $m$, placed in the vicinity of the substance serve to supply the current. Small trucks $n$ permit the substances to be treated to be readily and quickly transported.

In the case of thick planks, boards, sleepers, telegraphic posts, wooden pavements, etc., these are placed one on top of the other on the area, care being taken that the surfaces between the different pieces of wood and also between the upper and lower surfaces and the carpet electrode are intimately in contact. When one pile is completed the treatment is at once proceeded with by passing an electric current through both electrodes. The presence of moist carpets interposed between the electrodes and the substance is indispensable for equalizing the passage of the current throughout the mass to be treated.

It is necessary that the substance should be suitably moistened for if the humidity is too great, the current passes only through the conducting liquid without touching the fiber, but if the humidity is too restricted the electric resistance is too great and the treatment proceeds slowly and unequally.

When using continuous currents, it is advisable to reverse the current through the substance about every half hour so as to avoid electrolytic phenomena, which would cause the rapid destruction of the electrodes and carpets. It is preferable to utilize alternating current of low frequency.

The duration of the treatment is determined by the total quantity of current to be passed through the cellulose and by the density of the current for each cubic meter of the substance being treated. It varies, in practice, according to the nature of the fibrous matter, its degree of humidity and the thickness of the piled up substance; this duration varies between 10 to 20 hours.

In the particular case of the treatment of cut up woods such as sleepers, thick planks and wooden pavements, etc., it is sufficient if the impregnation is superficial and attains merely a few centimeters in thickness, for under the action of the electric current, the liquid is quickly led mechanically to the heart of the wood.

The passage of the current through the cellulose is facilitated and the protective effects of the treatment are increased by previously dissolving, saline substances in the immersion bath, such as sulfate of soda, sodium chlorid, zinc chlorid, etc. A solution containing a quantity of 1% of zinc chlorid, for instance, facilitates the transformation of the cellulose, which constitutes the essential parts of wood.

The process can be applied to any substance constituted by the cellulose in a free or agglomerated state such as ligneous matter, wood, textile plants, textile matter, artificial silk, fabrics, paperpaste, paper, etc.

What I claim is:

1. The herein described process for the treatment of cellulose, which consists in wetting the cellulose with an electrical conducting fluid, and then subjecting the wet cellulose matter to an electrical current, the electrical current changing the direction of its pulsation at stated periods.

2. The herein described process for treating cellulose matter, which consists in immersing the cellulose to be treated in a saline solution until the cellulose matter has absorbed some of the saline solution, and then subjecting the cellulose matter to an electrical current, the electrical current changing the direction of its pulsation at stated periods.

3. The herein described process of treating cellulose matter, consisting of immersing the substances to be treated in a saline solution to obtain a superficial impregnation, and subsequently subjecting the superficially impregnated substances to the prolonged action of an alternating current of electricity of low frequency.

In testimony whereof I have hereunto placed my hand at Bordeaux this fourth day of February 1913.

ALBERT LOUIS CAMILLE NODON.